(12) United States Patent
Dutta et al.

(10) Patent No.: US 7,548,885 B2
(45) Date of Patent: Jun. 16, 2009

(54) PROCESSING TAX FORMS AT AN AUTOMATIC TELLER MACHINE

(75) Inventors: Rabindranath Dutta, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 11/742,927

(22) Filed: May 1, 2007

(65) Prior Publication Data

US 2008/0109355 A1    May 8, 2008

Related U.S. Application Data

(62) Division of application No. 09/833,345, filed on Apr. 12, 2001, now abandoned.

(51) Int. Cl.
G06Q 40/00    (2006.01)

(52) U.S. Cl. .............................. 705/43; 705/31; 705/40

(58) Field of Classification Search ............. 705/42–45, 705/31
See application file for complete search history.

(56) References Cited

U.S. PATENT DOCUMENTS

| | | | |
|---|---|---|---|
| 5,025,139 A | 6/1991 | Halliburton, Jr. |
| 5,345,549 A | 9/1994 | Appel et al. |
| 5,422,467 A | 6/1995 | Graef et al. |
| 5,444,794 A | 8/1995 | Uhland, Sr. |
| 5,534,682 A | 7/1996 | Graef et al. |
| 5,540,425 A | 7/1996 | Graef et al. |
| 5,673,333 A | 9/1997 | Johnston |
| 5,677,955 A | 10/1997 | Doggett et al. |
| 5,751,842 A | 5/1998 | Riach et al. |
| 5,752,079 A | 5/1998 | Melen et al. |
| 5,910,988 A | 6/1999 | Ballard |
| 5,918,748 A | 7/1999 | Clark et al. |
| 5,987,439 A | 11/1999 | Gustin et al. |
| 6,012,048 A | 1/2000 | Gustin et al. |
| 6,021,202 A | 2/2000 | Anderson et al. |
| 6,032,137 A | 2/2000 | Ballard |
| 6,038,553 A | 3/2000 | Hyde, Jr. |
| 6,064,990 A | 5/2000 | Goldsmith |
| 6,105,009 A | 8/2000 | Cuervo |
| 6,164,529 A | 12/2000 | Peters et al. |
| 6,167,381 A | 12/2000 | Swaine et al. |
| 6,438,527 B1 | 8/2002 | Powar |

(Continued)

OTHER PUBLICATIONS

Souccar, "Visa in Partnership to Develop Wireless Financial Applications", American Banker, vol. 165, Issue 85, May 3, 2000, pp. 11.

(Continued)

*Primary Examiner*—Hani Kazimi
*Assistant Examiner*—Daniel Kesack
(74) *Attorney, Agent, or Firm*—Yee & Associates, P.C.; Jeffrey S. LaBaw

(57) ABSTRACT

A method, apparatus and computer implemented instructions for processing a bill in an automatic teller machine. The bill is scanned to form a bill image in which the bill includes a markup language providing payment information. Optical character recognition is performed on the bill image to identify the payment information. The bill is processed using the payment information. Bills, such as water bills, mortgages, credit card statements, and tax bills may be made in this manner.

4 Claims, 7 Drawing Sheets

U.S. PATENT DOCUMENTS

| | | |
|---|---|---|
| 6,654,797 B1 | 11/2003 | Kamper |
| 6,661,910 B2 | 12/2003 | Jones et al. |
| 6,705,517 B1 | 3/2004 | Zajkowski et al. |
| 6,754,640 B2 | 6/2004 | Bozeman |
| 6,782,402 B1 | 8/2004 | Hidaka et al. |
| 6,782,419 B2 | 8/2004 | Tobita et al. |
| 6,786,398 B1 | 9/2004 | Stinson et al. |
| 6,845,448 B1 | 1/2005 | Chaganti et al. |
| 7,088,907 B1 | 8/2006 | Nishijima et al. |
| 2001/0022848 A1 | 9/2001 | Rhoads |
| 2001/0051920 A1 | 12/2001 | Joao et al. |
| 2002/0023055 A1* | 2/2002 | Antognini et al. ............. 705/40 |
| 2002/0133437 A1 | 9/2002 | Ansley |
| 2002/0145035 A1 | 10/2002 | Jones |

OTHER PUBLICATIONS

Jeffords et al., "New technologies to combat check fraud", The CPA Journal, New York, vol. 69, Issue 3, Mar. 1999, pp. 1-7.

Kravitz, "SDML—Signed Document Markup Language", W3C Note, http://www.w3.org/TR/1998/NOTE-SDML-19980619/, Jun. 1998, retrieved Dec. 21, 2005, pp. 1-36.

Medina, "New applications for text recognition", ProQuest, Imaging $ Document Solutions, San Francisco, vol. 9, Issue 12, Dec. 2000, pp. 1-6.

Ramster, "End of the paper chase", Banking Technology, vol. 14, No. 6, Jul./Aug. 1997, pp. 32-36.

O'Brien, "The Changing Face of ATM Networks", Bank Systems & Technology, 37, 7; ABI/INFORM Global, Jul. 2000, pp. 38.

Anderson, "Checking In, Checking Out", Columbian, Vancouver, Washington, Mar. 28, 1999, pp. 1-5.

Barthel, "AT&T Global's Check Image Feature Expected to Boost Deposits at ATMs", American Banker, New York, New York, vol. 159, Issue 236, Dec. 9, 1994, pp. 17.

* cited by examiner

Figure 4
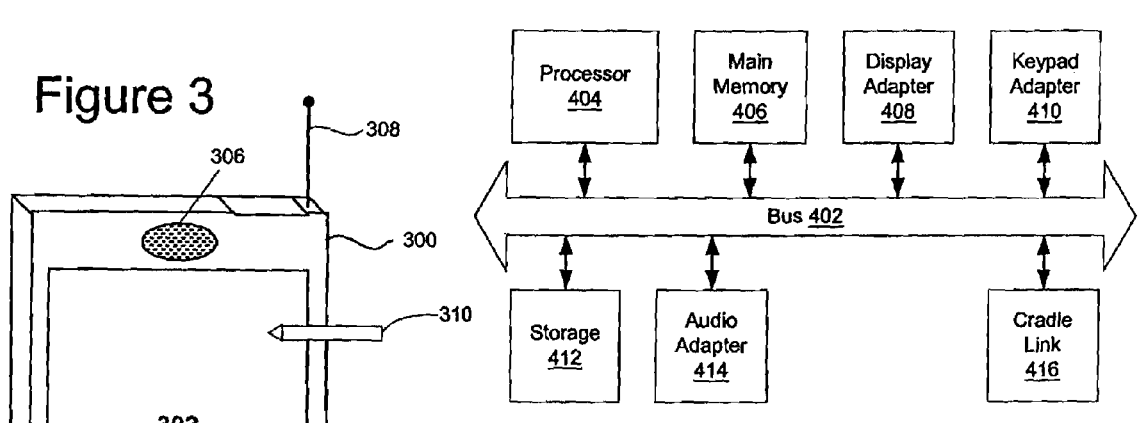
Figure 3
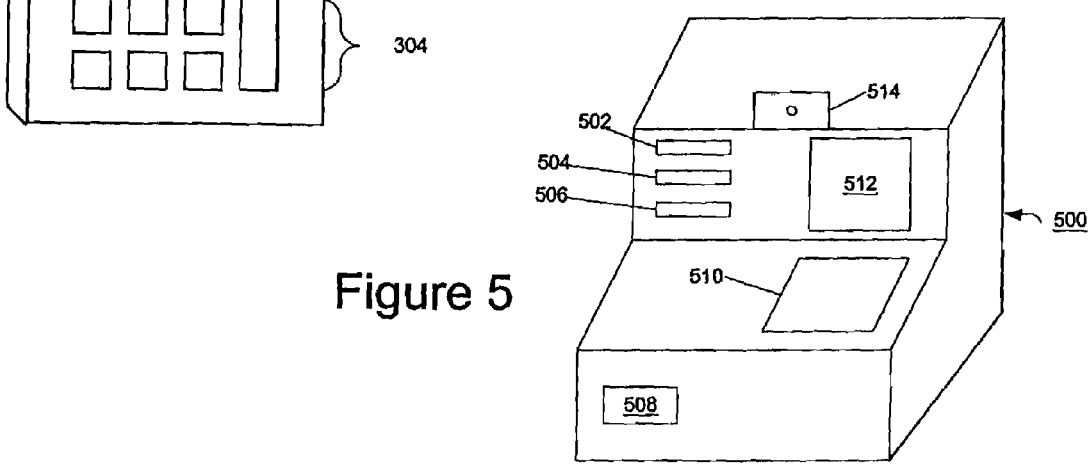
Figure 5

PROCESSING TAX FORMS AT AN AUTOMATIC TELLER MACHINE

CROSS REFERENCE TO RELATED APPLICATIONS

The present invention is related to the following applications: Method and Apparatus for Processing Checks at an Automatic Teller Machine for Electronic Transfer, serial no. 09/833,344, Method and Apparatus for Processing a Check within a Financial System, serial no. 09/833,340, Method and Apparatus for Incorporating Scanned Checks into Financial Applications, serial no. 09/833,347, and Method and Apparatus for Facilitating Transactions at an Automatic Teller Machine, serial no. 09/833,339, filed even date hereof, assigned to the same assignee, and incorporated herein by reference.

BACKGROUND OF THE INVENTION

This application is a divisional of application number 09/833,345, filed Apr. 12, 2001, now abandoned, which is herein incorporated by reference.

1. Technical Field

The present invention relates generally to an improved data processing system and in particular to a method and apparatus for processing bills in a data processing system. Still more particularly, the present invention provides a method and apparatus for bills and bill payments at an automatic teller machine.

2. Description of Related Art

Automatic teller machines (ATMS) are widely available devices used for dispensing cash. An ATM user is provided with an ATM card as well as a personal identification number (PIN) or password for use in withdrawing funds. Typically, the ATM user withdraws cash from a checking account, a savings account, or as an advance from a credit card. A user also may use an ATM to transfer money from a savings account to a checking account. In other instances the user uses the ATM to ascertain an account balance for a checking account or savings account.

Other uses have been added to ATMs other than dispensing cash. For example, some ATMs now provide a feature in which stamps are dispensed to the user rather than cash. Another use is an ability to deposit cash or checks through an ATM. A user places cash or a check in an envelope provided at the ATM. Next, the user places the ATM card into the ATM, enters a PIN number, and selects an option to make a deposit. The user then enters the amount being deposited and places the envelope into the ATM. Deposits are then later collected and processed. ATMs are widely used because they provide convenient services that are often not available at a business location of a financial institution. For example, a at ATM a user may obtain cash 24 hours a day. Although these types of ATM services are becoming more widespread and easy to access, the variety in the type of services provided by an ATM are still limited.

Therefore, it would be advantageous to have an improved method and apparatus for providing additional services at an ATM.

SUMMARY OF THE INVENTION

The present invention provides a method, apparatus and computer implemented instructions for processing a bill in an automatic teller machine. The bill is scanned to form a bill image in which the bill includes a markup language providing payment information. Optical character recognition is performed on the bill image to identify the payment information. The bill is processed using the payment information. Bills, such as water bills, mortgages, credit card statements, and tax bills may be paid in this manner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram of a client in the form of a personal digital assistant (PDA) in accordance with a preferred embodiment of the present invention;

FIG. 4 is a block diagram of a PDA in accordance with a preferred embodiment of the present invention;

FIG. 5 is a diagram illustrating an automatic teller machine (ATM) in accordance with a preferred embodiment of the present invention;

DETAILED DESCRIPTION OF THE PREFERRED EMBODIMENT

Figure 1:
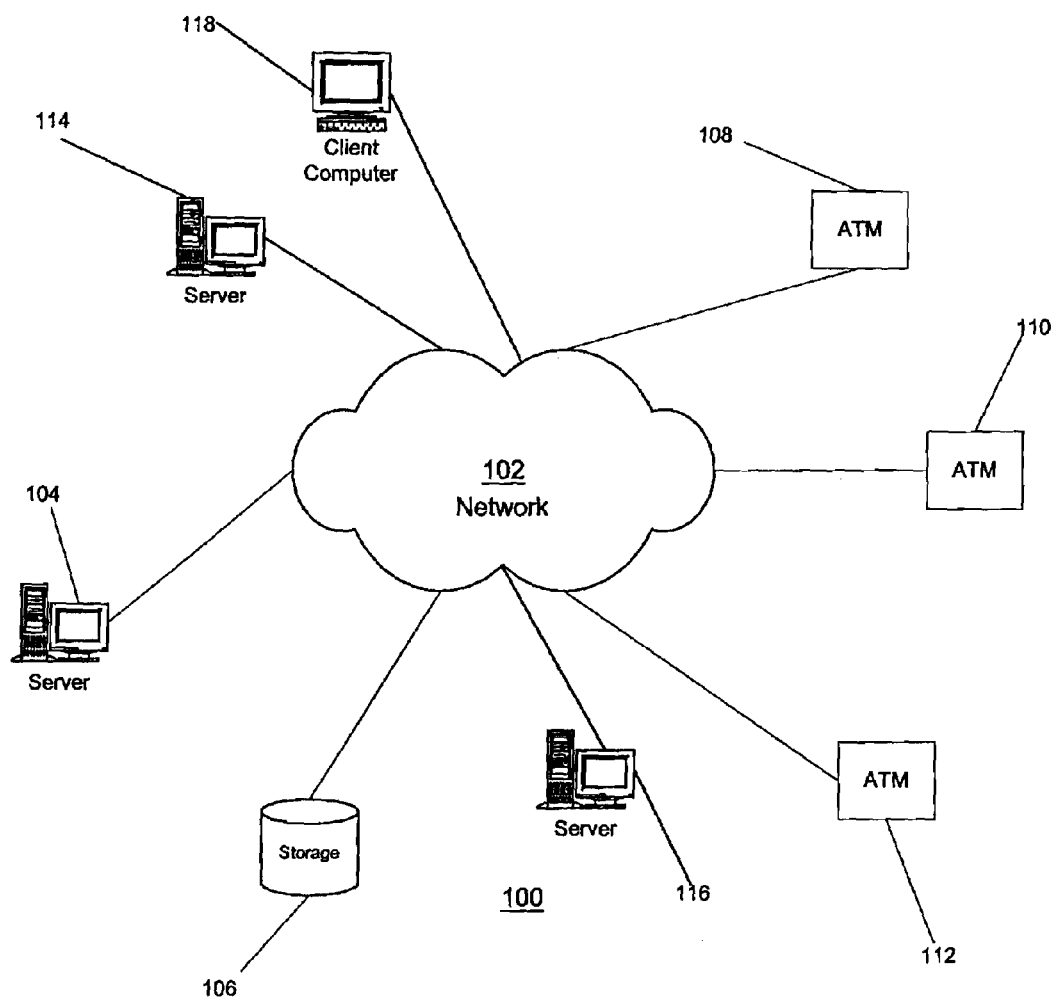
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. Server 104 is a computer located at a financial institution, such as a bank, a credit union, a mortgage company, or a brokerage firm.

Server 104 is used to provide various functions relating to daily financial transactions handled by the bank, such as deposits and withdrawals of funds. In addition, ATMs 108, 110, and 112 also are connected to network 102. ATMs 108, 110, and 112 are clients to server 104. Server 104 is in communication with ATMS 108, 110, and 112 to handle various transactions that users may initiate at these devices. For example, if a user withdraws cash from ATM 108, the debiting of the account is handled by server 104.

Server 114 and server 116 also are connected to network 102 and may represent computers located at other financial institutions. ATMs 108, 110, and 112 also may be clients to these servers depending on the particular user accessing ATMs 108, 110 and 112. Additionally, these servers also may represent computers located at other financial institutions, such as a regional clearinghouse, a national clearinghouse, or a Federal Reserve Bank.

The present invention provides for scanning of checks or bills at an ATM, such as ATM 108, when a user deposits a check with the financial institution or desires to pay a bill. With a check, an image of both sides of the check is made when the check is deposited. Additionally, optical character recognition is performed on the check to obtain information, such as the recipient of the check, and the amount of funds to be transferred from the account. Further, a magnetic ink reader reads magnetic ink data on the check to obtain information, such as the bank's identification number as well as the user's checking account number with the bank. A markup language document is created containing this other information obtained from the check. The markup language document forms an electronic check. Additionally, the image of the check also may be associated with the markup language document as part of the electronic check. This electronic check is then sent from ATM 108 to server 104 for processing.

When a bill is to be processed for payment, the bill is scanned in and particular payment information is identified from markup language information located in the bill. This information may include, for example, the name of the company originating the bill, a payment address, and a payment amount, as well as any information needed to facilitate payment of the bill by a user at an ATM. Additionally, the present invention also provides other services, such as converting a regular check to a certified check and issuing temporary identification documents.

Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
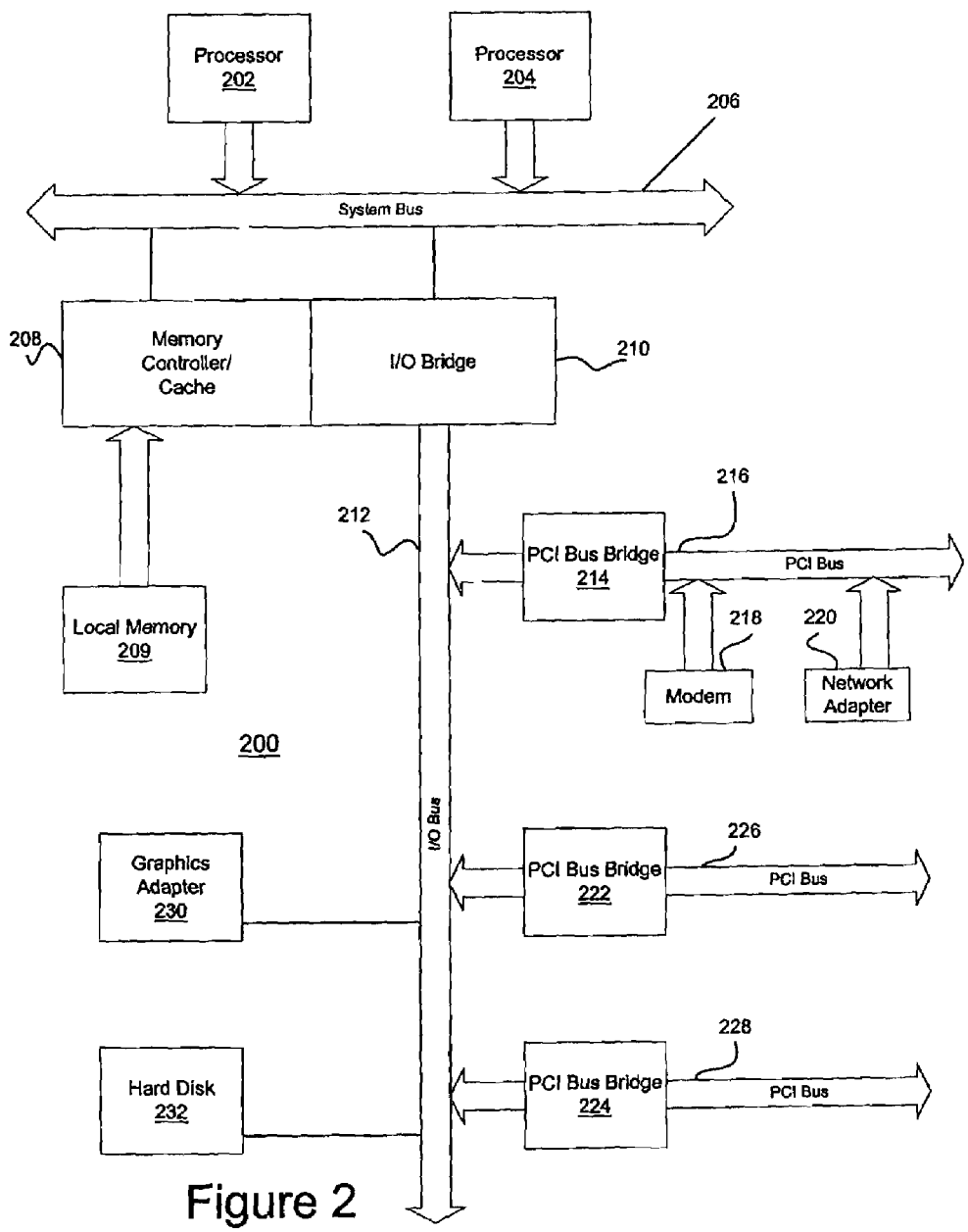
FIG. 2 is a block diagram of a data processing system that may be implemented as a server in accordance with a preferred embodiment of the present invention.

Referring to FIG. 2, a block diagram of a data processing system that may be implemented as a server, such as server 104, 114, or 116 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to ATMs 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system.

With reference now to FIG. 3, a diagram of a client in the form of a personal digital assistant (PDA) is depicted in accordance with a preferred embodiment of the present invention. PDA 300 may be used to receive a confirmation of a bill payment or a check deposit. Further, a user may pre-scan a bill into PDA 300 and transmit that image to an ATM, such as ATM 108 in FIG. 1 for payment processing.

PDA 300 includes a display 302 for presenting textual and graphical information. Display 302 may be a known display device, such as a liquid crystal display (LCD) device. The display may be used to present a map or directions, calendar information, a telephone directory, or an electronic mail message. In these examples, display 302 may receive user input using an input device such as, for example, stylus 310.

PDA 300 may also include keypad 304, speaker 306, and antenna 308. Keypad 304 may be used to receive user input in addition to using display 302. Speaker 306 provides a mechanism for audio output, such as presentation of an audio file. Antenna 308 provides a mechanism used in establishing a wireless communications link between PDA 300 and a network, such as network 102 in FIG. 1.

PDA 300 also preferably includes a graphical user interface that may be implemented by means of systems software residing in computer readable media in operation within PDA 300.

Turning now to FIG. 4, a block diagram of a PDA is shown in accordance with a preferred embodiment of the present invention. PDA 400 is an example of a PDA, such as PDA 300 in FIG. 3, in which code or instructions implementing the processes of the present invention may be located. PDA 400 includes a bus 402 to which processor 404 and main memory 406 are connected. Display adapter 408, keypad adapter 410, storage 412, and audio adapter 414 also are connected to bus 402. Cradle link 416 provides a mechanism to connect PDA 400 to a cradle used in synchronizing data in PDA 400 with another data processing system. Further, display adapter 408 also includes a mechanism to receive user input from a stylus when a touch screen display is employed.

An operating system runs on processor 404 and is used to coordinate and provide control of various components within PDA 400 in FIG. 4. The operating system may be, for example, a commercially available operating system such as Windows CE, which is available from Microsoft Corporation. Instructions for the operating system and applications or programs are located on storage devices, such as storage 412, and may be loaded into main memory 406 for execution by processor 404.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Turning next to FIG. 5, a diagram illustrating an automatic teller machine (ATM) is depicted in accordance with a preferred embodiment of the present invention. ATM 500 is an illustration of an ATM, such as ATM 108, 110 or 112 in FIG. 1.

In this example, an ATM card or a smart card may be received in slot 502. ATM 500 also includes an input slot 504 and an output slot 506. Input slot 504 is used to receive items, such as cash or a check for deposit. Cash dispenser slot 508 is used to dispense cash to a user. Keypad 510 provides an input device for a user to input information, such as an amount of money that is to be deposited or to make selections, such as receiving an account balance or an amount of cash to withdraw. Display 512 is used to present information to the user. Video camera 514 provides for recording transactions. Additionally, video camera 514 may be used to capture an image of the user at ATM 500.

Figure 6:
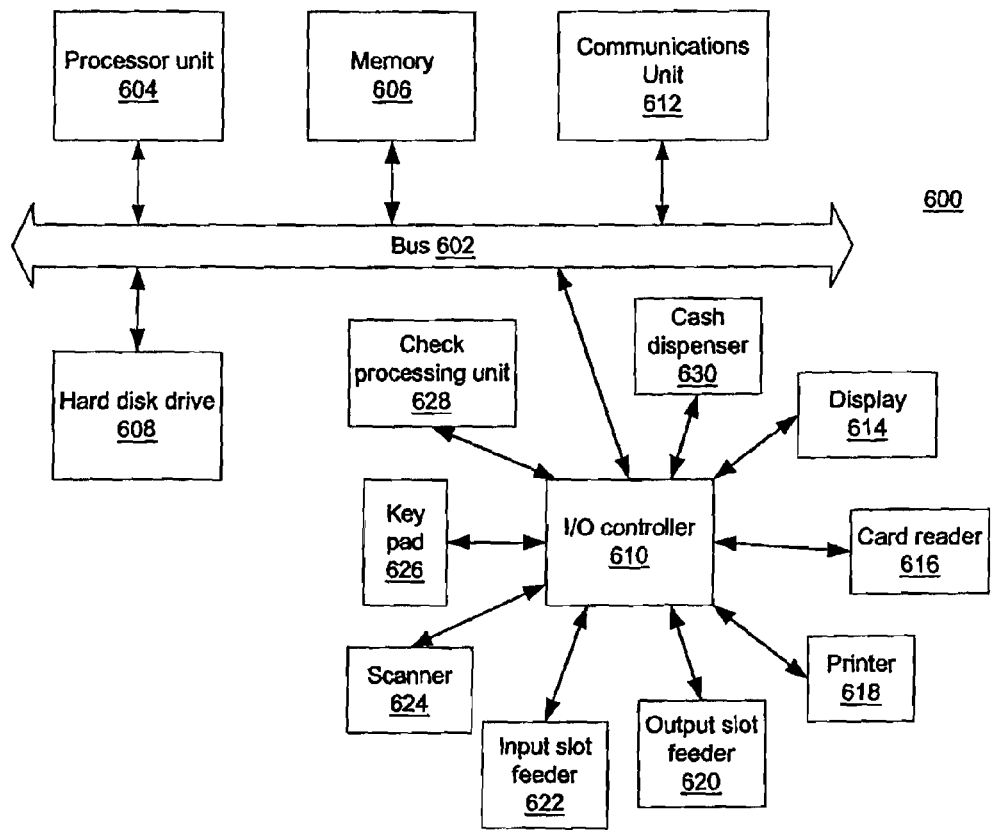
FIG. 6 is a block diagram illustrating an ATM in accordance with a preferred embodiment of the present invention.

Turning next to FIG. 6, a block diagram illustrating an ATM is depicted in accordance with a preferred embodiment of the present invention. ATM 600 may be implemented as in ATM 108, 110, or 112 in FIG. 1.

In the depicted examples, bus 602 connects processor unit 604, memory 606, hard disk drive 608, I/O controller 610, and communications unit 612. Computer instructions may be located in memory 606 or in hard disk drive 608. These instructions are processed by processor unit 604 to provide ATM functions as well as the check scanning and electronic check creation processes of the present invention. Additionally, transaction information may also be stored on hard disk drive 608. Communications unit 612 establishes a communications link with a server, such as server 104, 114 or 116 in FIG. 1 through a network, such as network 102 in FIG. 1.

I/O controller 610 provides a mechanism for input/output devices, such as, for example, display 614, card reader 616, printer 618, output slot feeder 620, input slot feeder 622, scanner 624, keypad 626, check processing unit 628, and cash dispenser 630. Display 614 provides a mechanism to present information to the ATM user. Card reader 616 is used to read an ATM card or a smart card inserted into the ATM. Printer 618 is used to print a receipt or other information in response to a user input. Keypad 626 is used to receive user input. Output slot feeder 620 is used to feed receipts generated by printer 618 to an output slot, such as output slot 506 in FIG. 5. Input slot reader 622 is used to receive checks, documents, or cash placed into an input slot, such as input slot 504 in FIG. 5. Check processing unit 628 is used to move a check within the ATM. In particular, check processing unit 628 may move a check into a position for scanning by scanner 624 and then move the check into storage. If a check is not accepted, the check may be returned to output slot feeder 620 for return to a user. Additionally, check processing unit 628 may be employed to position other documents for scanning by scanner 624. For example, this unit may be used to position a bill for scanning. Cash dispenser 630 is used to dispense cash when a user withdraws funds from a user account.

The components depicted in FIGS. 5 and 6 are provided for purposes of illustration and are not meant to imply architectural limitations to the present invention.

Figure 7:
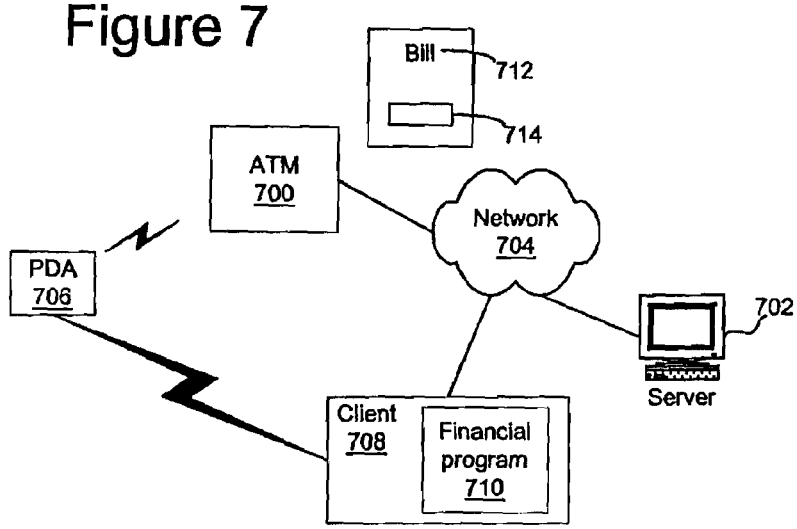
FIG. 7 is a diagram illustrating transfer of information for import into a financial application in accordance with a preferred embodiment of the present invention.

With reference now to FIG. 7, a diagram illustrating transfer of information for import into a financial application is depicted in accordance with a preferred embodiment of the present invention. A user may deposit a check at ATM 700 for credit to the user's account with a financial institution. Alternatively, the user may deposit a document, such as a bill, for processing at ATM 700. In these examples, the check or bill is scanned within ATM 700 to create an image of the check or bill. In the case of a check, the image of the check and information obtained from the check may be sent to server 702 located at the financial institution through network 704.

Information regarding the deposit of the check may be returned to ATM 700 from server 702. This information as well as an image of the check may be downloaded to the user through a mobile device, such as PDA 706. PDA 706 is shown for purposes of illustration and other mobile devices, such as a mobile phone, also may be used. In the depicted examples, the information is placed into a format that may be imported by various financial programs. The user may then upload the information to client 708 for import to financial program 710. In this manner, check images and other financial information may be easily integrated into financial programs or applications. Financial programs also could be located in PDA 706 depending on the implementation.

Additionally, the check image and other financial information may be sent or made available to a user through a Web site or sending of an e-mail. For example, the check image and information may be placed into a file in a format for import to a financial program on a secure Web site. The user accesses the Web site through client 708 by entering an appropriate ID and password. The user may then download the file for import and use in the financial program. The transfer takes place using a secure connection, such as that provided by the Secure Sockets Layer (SSL) protocol. Alternatively, the information may be sent in an e-mail or as an attachment to an e-mail in an encrypted form.

In addition, a user may process bills for payment at ATM 700. A user may scan in bill 712 at ATM 700 or transfer an electronic copy of the bill from a mobile device, such as, for example, PDA 706. If the bill is a physical one, ATM 700 will scan bill 712 to create an image of the bill. In the depicted examples, bill 712 includes payment information 714, which is in a markup language format in these examples. Financial services markup language (FSML) or other markup languages, such as extensible markup language (XML) may be used. Payment information 714 may take different forms, such as text or a bar code, depending on the implementation. The scanned image is searched to identify payment information 714, which is used to process the bill for the user at ATM 700.

The user may be presented with various payment options to pay the bill as well as select a payment amount if some amount other than the full payment is acceptable as identified from payment information 714. Payment options may include, for example, through a direct transfer of funds, a check, or a credit card.

Figure 8:
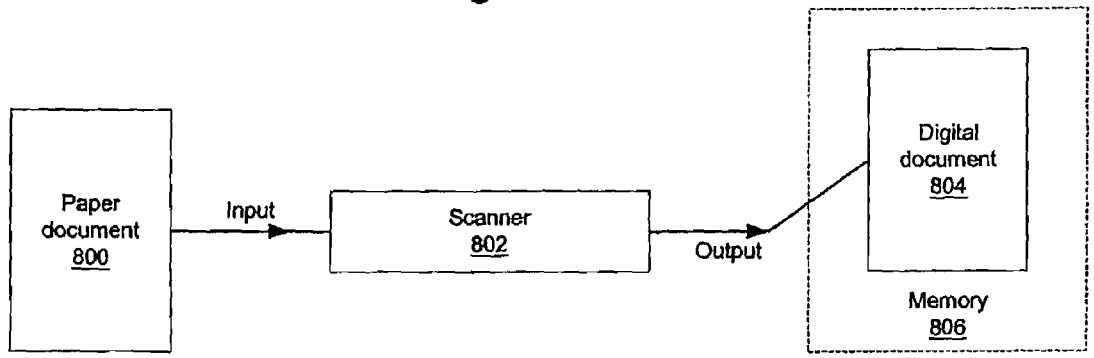
FIG. 8 is a diagram illustrating data flow in creating a check image in accordance with a preferred embodiment of the present invention.

Turning next to FIG. 8, a diagram illustrating data flow in creating a check image is depicted in accordance with a preferred embodiment of the present invention. Paper document 800 is input or placed into an ATM, such as ATM 500 through input slot 504 in FIG. 5. In this example, paper document 800 is a check. Scanner 802 scans both sides of paper document 800. In this manner, endorsements as well as signature and amount information from the front of the check may be obtained. Digital document 804 is generated by scanner 802 and stored in memory 806 for further processing. Optical character recognition processes (OCR) may be initiated to process digital document 804 to generate information used in creating a markup language representation of paper document 800. In these examples, this markup language representation form is an electronic check.

Figure 9:
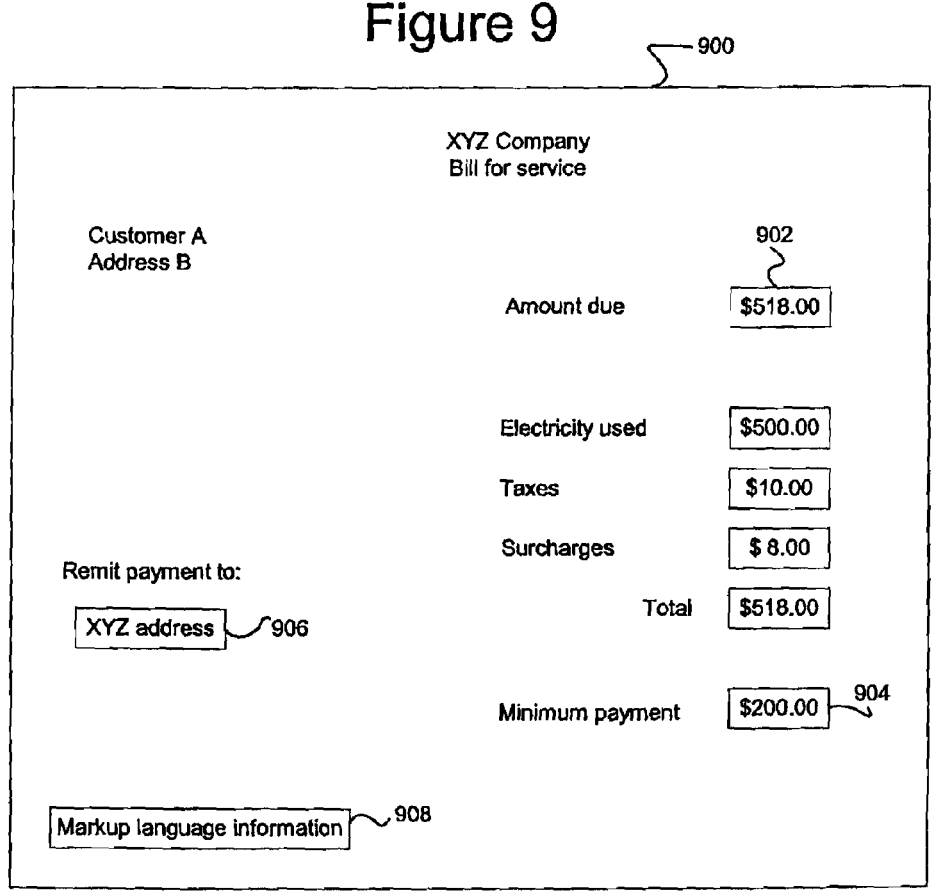
FIG. 9 is a diagram illustrating a bill in accordance with a preferred embodiment of the present invention.

Turning next to FIG. 9, a diagram illustrating a bill is depicted in accordance with a preferred embodiment of the present invention. Bill 900 is an example of a bill, which may be processes by scanner 802 in FIG. 8. Bill 900 contains information, which may be read by a user in paying bill 900 through conventional means. For example, bill 900 includes amount due 902, minimum payment 904, and payment address 906.

Bill 900 also allows for bill payment through scanning of bill 900 into an ATM or other scanning device. This type of bill payment is facilitated through markup language information 908 located in bill 900. This information may not be in a user readable format. For example, the markup language information may take the form of a bar code in addition to text. Markup language information 908 contains the information needed to facilitate a bill payment for the user at an ATM. For example, markup language information 908 may include amount due, a minimum payment, and a payment address as well as the name of the company to which the payment is to be sent. This information is described for purposes of illustration and other information may be included or in place of the described information depending on the particular implementation.

Figure 10:
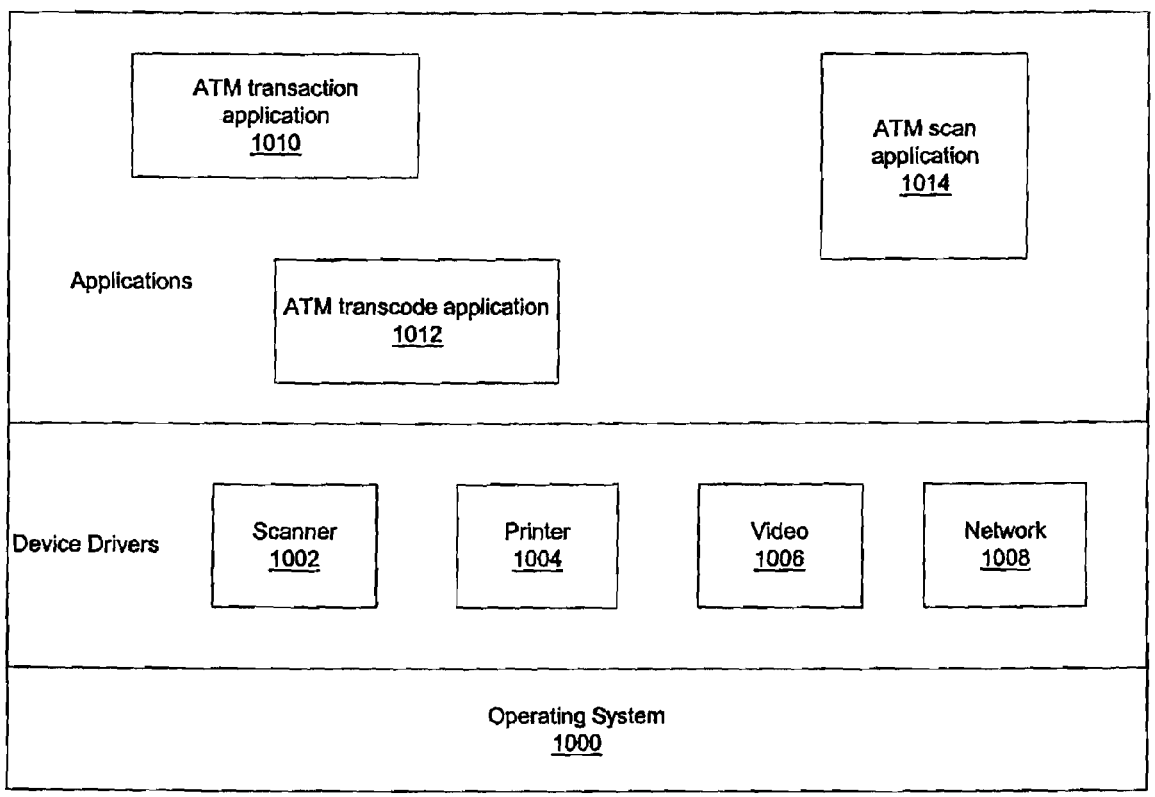
FIG. 10 is a diagram illustrating software components in an ATM in accordance with a preferred embodiment of the present invention.

Turning next to FIG. 10, a diagram illustrating software components in an ATM is depicted in accordance with a preferred embodiment of the present invention. In this example, the software components in an ATM include operating system 1000, scanner device driver 1002, printer device driver 1004, video device driver 1006, network device driver 1008, ATM transaction application 1010, ATM transcode application 1012, and ATM scan application 1014.

The device drivers provide the components needed to operate devices within an ATM. These device drivers are used by ATM transaction application 1010, ATM transcode application 1012, and ATM scan application 1014 to perform various input/output functions.

ATM transaction application 1010 provides a process for various transactions by a user. Cash withdrawals, balance inquiries, fund transfers, deposits, and bill processing and payments are examples of transactions that may be handled through ATM transaction application 1010. Additionally, ATM transaction application 1010 handles the transmission and receipt of information to and from various financial institutions. When a check is deposited, ATM scan application 1014 is initiated to create an image of the check. In the depicted examples, the image is of both sides of the check. Additionally, ATM scan application 1014 also will include optical character recognition processes to obtain data for use in creating an electronic check. This data is used by ATM transcode application 1012 to generate a markup language representation of the check.

With respect to bills, payment information may be included on the bill in a markup language format, such as financial services markup language (FSML) or extensible markup language. This payment information may include, for example, amount of the bill, a minimum payment amount, the recipient of the bill, the originator of the bill, address for payments, and a due date for payment.

ATM transaction application 1010 also may transfer the image of a check and other information to a user mobile device, such as a PDA or mobile phone. The user may then upload that information to a computer containing a financial program. The image and information is placed into a format that allows for its import into the financial program.

In these examples, the markup language may be financial services markup language (FSML) and signed document markup language (SDML). FSML is used to implement electronic checks and other secure financial documents. FSML defines a method to structure documents into blocks of tagged content. Unlike HTML, which uses tags to inform processors about how to display content, FSML uses tags to inform processors about how to use the document content in financial applications. The FSML content blocks in an FSML document can be cryptographically sealed and signed in any combination needed by business applications. Document processors may also remove blocks without invalidating the signatures on the remaining blocks. They may combine signed documents and then sign blocks contained in the combined documents. Signatures are themselves structured as FSML blocks, as are the X.509 certificates needed by downstream processors to verify the signatures. Thus signatures and certificates become part of the FSML document, so they can be verified and countersigned by later signers.

SDML is designed to tag the individual text items making up a document, group the text items into document parts which can have business meaning and can be signed individually or together, allow document parts to be added and deleted without invalidating previous signatures, and allow signing, cosigning, endorsing, co-endorsing, and witnessing operations on documents and document parts. The signatures become part of the SDML document and can be verified by subsequent recipients as the document travels through the business process. SDML does not define encryption, since encryption is between each sender and receiver in the business process and can differ for each link depending on the transport used. SDML is the generic document structuring and signing part of the FSML.

In the depicted examples, the markup language document forms an electronic check. Depending on the implementation, the electronic check also may include the image of the check.

Figure 11:
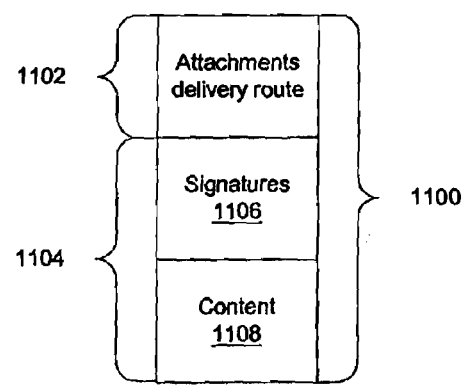

Turning next to FIG. 11 an illustration of a message sent from an ATM to a financial institution is depicted in accordance with a preferred embodiment of the present invention. Message 1100 is an example of a message that may be sent from an ATM to a financial institution. For example, an electronic check or a bill payment generated at an ATM, such as ATM 108, may be sent to server 104 in FIG. 1 for processing. The electronic check or bill payment may be sent within message 1100.

Message 1100 includes header 1102 and body 1104. Header 1102 may include information, such as an identification of attachments and a delivery route for the message. Body 1104 may include signature 1106 as well as content 1108. Signature 1106 may be obtained from scanning of the check or via a digital signature from a smart card held by the user. Content 1108 may contain the digital image of the check and/or an electronic check. The electronic check may be a document created using FSML and SDML.

Figure 12:
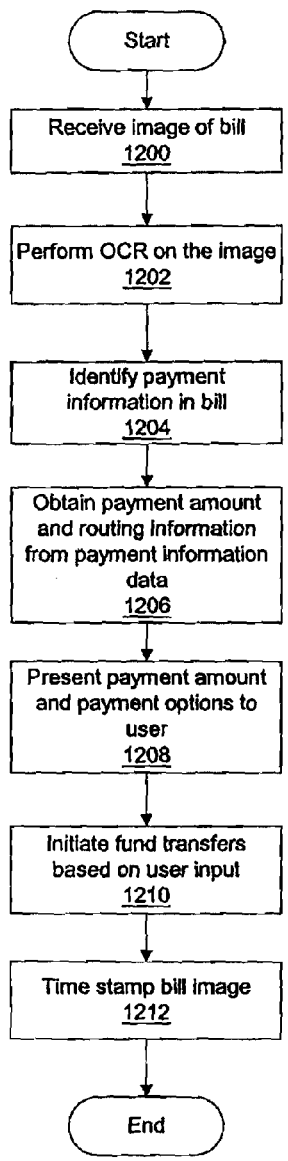
FIG. 12 is a flowchart of a process used for processing a bill and a bill payment in accordance with a preferred embodiment of the present invention.

Turning now to FIG. 12, a flowchart of a process used for processing a bill and a bill payment is depicted in accordance with a preferred embodiment of the present invention. The process illustrated in FIG. 12 may be implemented in a program, such as ATM transaction application 1010 in FIG. 10.

The process begins by receiving an image of a bill (step 1200). In these examples, the bill is scanned at the ATM to create the image. The bill includes payment information in a markup language format, such as FSML. This markup language information may be, for example, in text, a bar code, or other forms depending on the implementation. OCR is performed on this image (step 1202). Next, the payment information in the bill is identified (step 1204). Payment amount and routing information is obtained from the payment information (step 1206). Payment amount and payment options are then presented to the user (step 1208). These options may include paying a lesser amount if a full payment is not required. For example, a minimum payment may be allowed. The user may choose to pay the bill through various means, such as, for example, a direct transfer of funds, a credit card, or a check.

Fund transfers are initiated based on the user's input (step 1210). The bill image is time stamped (step 1212) with the process terminating thereafter. The time stamping may be used to verify when the payment occurred.

Figure 13:
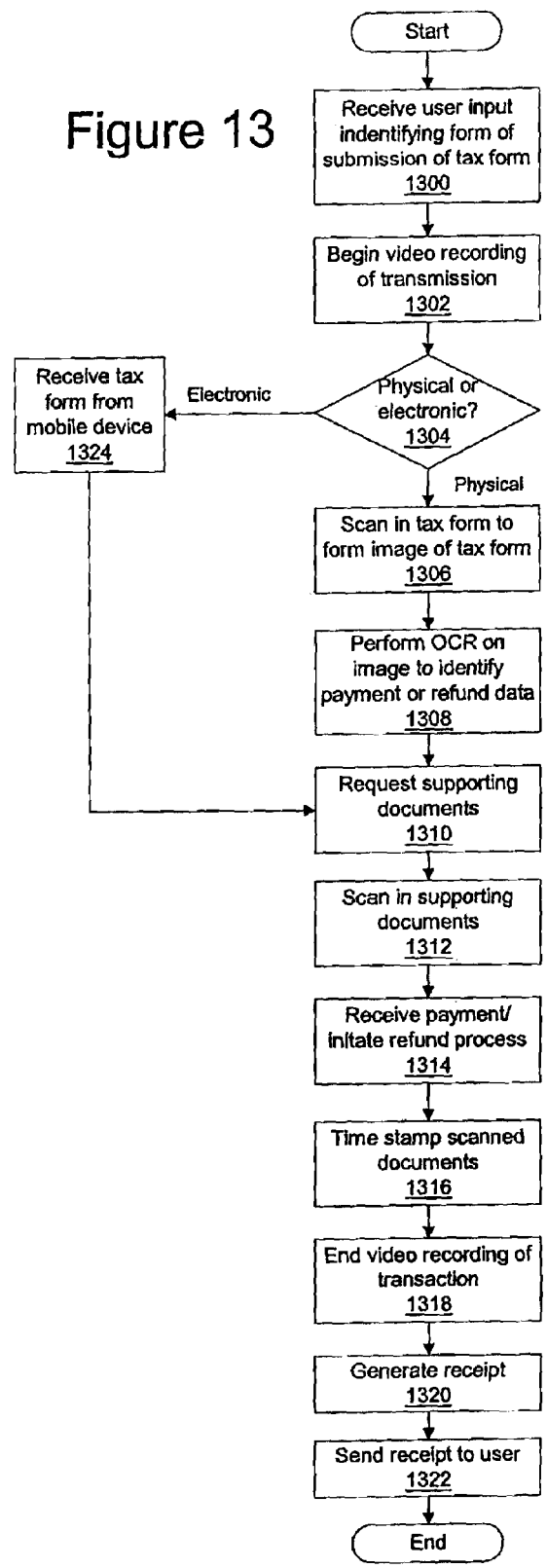
FIG. 13 is a flowchart of a process used for paying a tax bill in accordance with a preferred embodiment of the present invention.

With reference now to FIG. 13, a flowchart of a process used for paying a tax bill is depicted in accordance with a preferred embodiment of the present invention. The process illustrated in FIG. 13 may be implemented in a program, such as ATM transaction application 1010 in FIG. 10.

The process begins by receiving input from a user identifying a form of submission of a tax form (step 1300). The form of submission in these examples may be a physical tax form or an electronic one. Video recording of the transmission begins (step 1302). A determination is then made as to whether the tax form is physical or electronic (step 1304).

If the tax form is physical, it is scanned to form an image of the tax form (step 1306). OCR is then performed on the image of the tax form to identify payment or refund data (step 1308). The information may be identified using templates to identify locations of information on the image. Most tax forms are standardized, allowing for the use of templates. Also, the information also may be in a markup language form, similar to the payment information as described above with respect to FIG. 12.

Next, supporting documents are requested (step 1310). Supporting documents are scanned in (step 1312). Payment is then received or a refund process is initiated depending on the tax form (step 1314). The scanned documents are time stamped (step 1316), and the video recording of the transaction ends (step 1318). A receipt is then generated (step 1320). The receipt is sent to the user (step 1322) with the process terminating thereafter. This receipt may be sent, for example, by printing the receipt at the ATM, by sending an electronic receipt to a mobile device carried by the user, or an e-mail message to the user.

With reference again to step 1304, if the tax form is electronic, the tax form is received from a mobile device (step 1324) with the process proceeding to step 1310 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the smart card may be replaced by a regular credit card or an ATM card with some loss in functionality. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in an automatic teller machine for processing a tax form, the method comprising:

receiving input from a user identifying a form of submission of a tax form, wherein the form of submission comprises one of a physical tax form or an electronic tax form;

beginning a video recording of the user;

determining whether the form of submission of the tax form comprises a physical tax form or an electronic tax form;

in response to determining that the form of submission of the tax form comprises an electronic tax form, receiving the electronic tax form from a mobile device to generate data, and in response to determining that the form of submission of the tax form comprises a physical tax form, scanning the physical tax form to create an image of the physical tax form and performing optical character recognition on the image of the physical tax form to generate the data; and processing the tax form based on the data, wherein processing the tax form based on the data comprises:

requesting at least one supporting document for the tax form from the user;

scanning the at least one supporting document for the tax form to generate at least one additional image;

receiving a payment or initiating a refund process in accordance with the tax form; and time stamping the scanned at least one supporting document;

ending the video recording of the user;

generating a receipt, and;

sending the receipt to the user.

2. The method of claim 1, wherein the processing the tax form generates a result, and further comprising:

confirming the result with the user.

3. The method of claim 1, wherein generating a receipt comprises one of generating a printed receipt at the automatic teller machine, sending an electronic receipt to the mobile device, or sending an email to the user.

4. The method of claim 1, wherein the mobile device comprises a personal digital assistant (PDA).

* * * * *